Nov. 16, 1937.    R. H. DRAEGER    2,098,955
FILM EDITING DEVICE
Filed Oct. 15, 1936    2 Sheets-Sheet 1
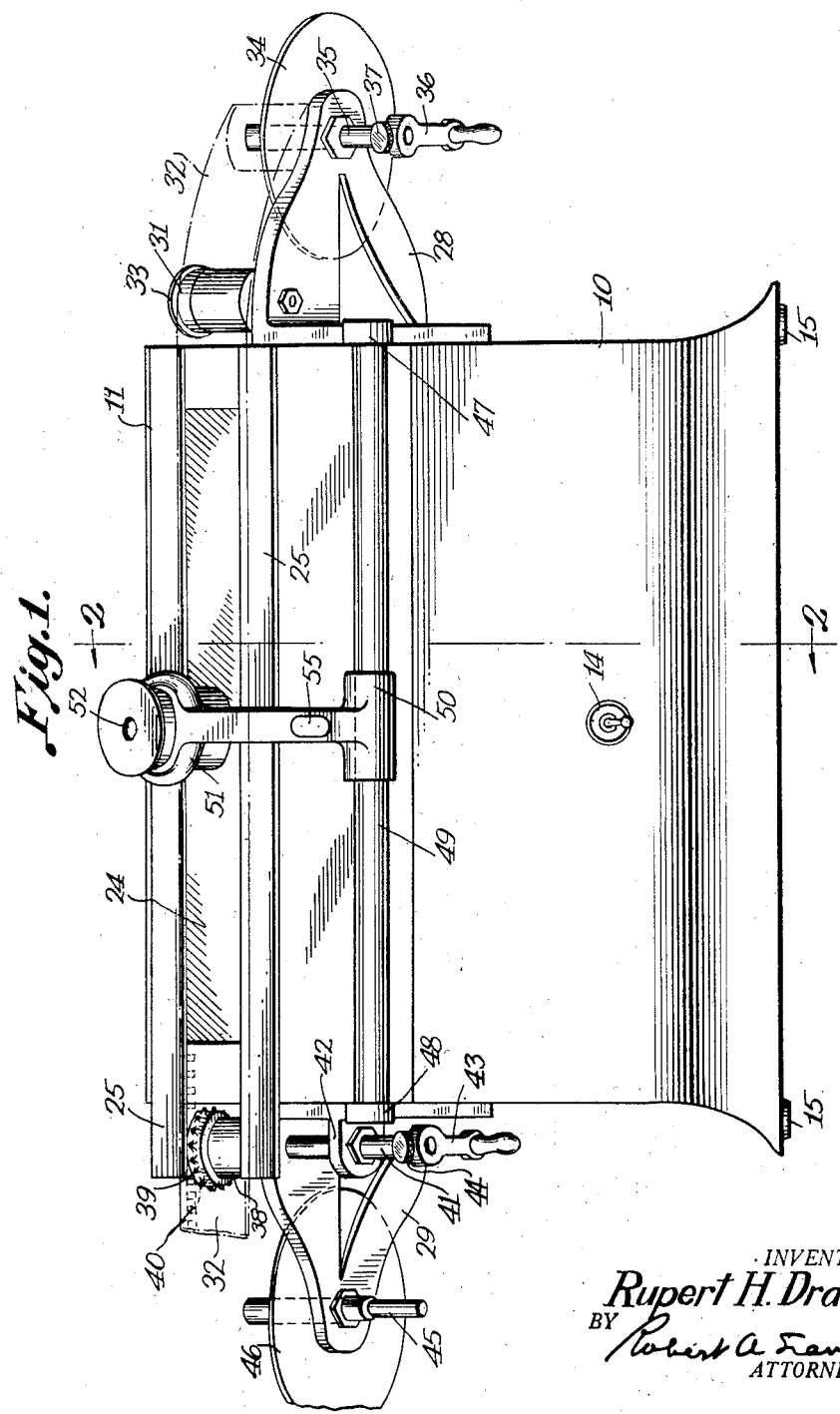
INVENTOR.
Rupert H. Draeger
BY
Robert A. Tavender
ATTORNEY

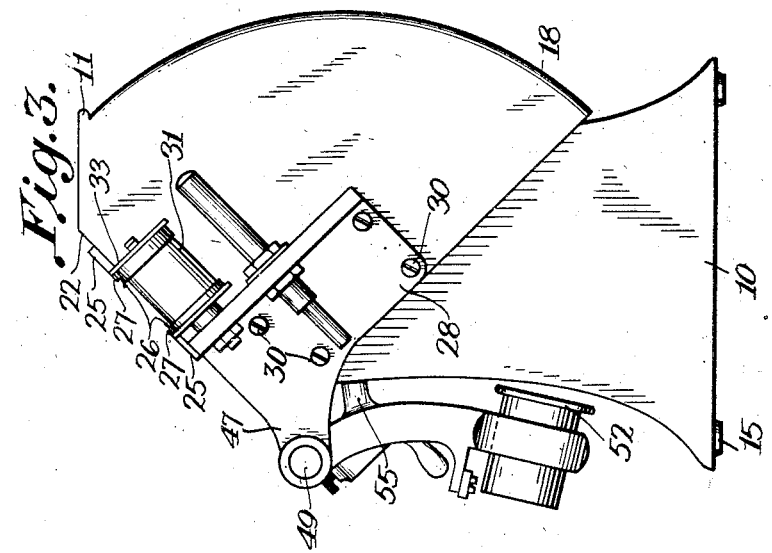
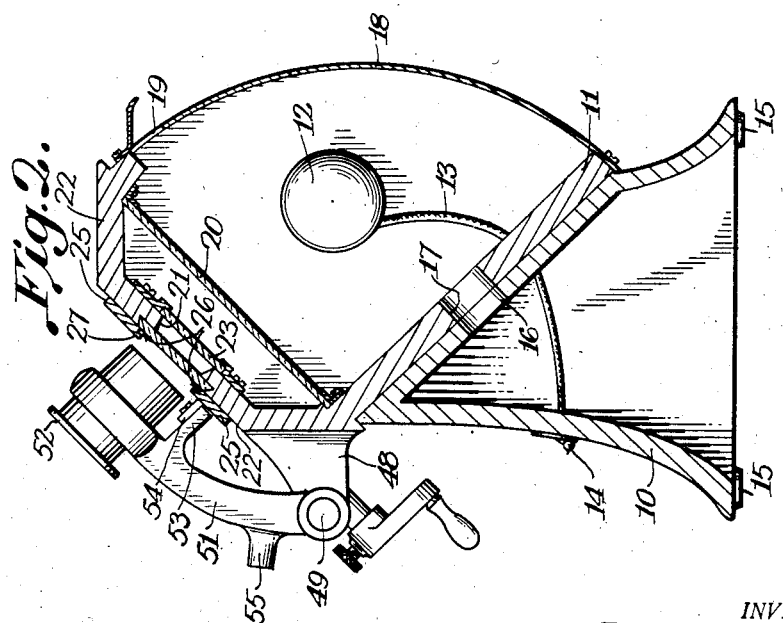

Patented Nov. 16, 1937

2,098,955

UNITED STATES PATENT OFFICE 2,098,955

FILM EDITING DEVICE

Rupert H. Draeger, United States Navy

Application October 15, 1936, Serial No. 105,651

1 Claim. (Cl. 88—14)

(Granted under the Act of March 3, 1883, as amended April 30, 1928; 370 O. G. 757)

This invention relates to editing devices and particularly to editing devices adapted to edit film strips carrying photographed copies of books, pamphlets, drawings and the like.

An object of the invention is to provide an editing device adapted to accommodate a complete roll of film to be edited.

Another object of the invention is to provide an editing device adapted to hold short strips of film as well as full rolls of film for the purpose of editing them.

A further object of the invention is to provide an editing device making it possible to simultaneously place a number of film frames in position for being edited, thereby eliminating the necessity of adjusting the film whenever one film frame has been edited.

Another object of the invention is to provide an editing device having a means for magnifying the images on the film strips for editing purposes.

Another object of the invention is to provide an editing device in which a length of film containing a number of film frames may be simultaneously placed in position for being edited and having a means for magnifying the images on the frames, the magnifying means being slidably arranged over the film.

Another object of the invention is to provide an editing device having a controllable lighting means adapted to illuminate the film portion in position for being edited, whereby the work of editing is facilitated.

Another object of the invention is to provide an editing device for opaque or translucent strip copy such as contact photographic prints.

Other objects of the invention not especially mentioned may readily be ascertained and understood from the following description in connection with the accompanying drawings forming a part thereof.

In the drawings:

Fig. 1 is a front elevational view of the film editing machine of this invention;

Fig. 2 is a sectional view taken on line 2—2 of Fig. 1, and

Fig. 3 is an end view looking from the right side of Fig. 1, the magnifying device being pivoted downwardly, away from the film to be edited.

The film editing device of the present invention has a hollow base 10, on which the body 11 of the device is mounted. An electric light bulb 12 is arranged inside the body 11 in any convenient manner and a conduit 13 connects the bulb 12 with a control switch 14 in the front of the base 10. The base is provided with cushion feet 15.

One or more corresponding ventilating holes 16 and 17 are provided in the abutting walls of the base and the body respectively. The rear wall 18 of the body may be formed by a curved plate as shown in Figs. 2 and 3, and this plate may serve as a reflector for light from the light bulb 12. The rear wall 18 has a plurality of vent holes 19 therein arranged along its upper edge. The corresponding holes 16 and 17 and the holes 19 serve to ventilate the interior of the body and to disperse the heat created by the lamp bulb 12.

In order to arrange the film to be edited in a position as convenient as possible for the operator, the front wall 22 of the body 11 is placed on a slant, preferably at an angle of 45 degrees. A window opening 21 is provided in the front wall 22 and a glass plate 20 is arranged underneath said wall, spaced therefrom and extending parallel thereto the full length of the interior chamber. This glass plate is made of opal, ground or other translucent diffusing glass.

A second diffusing glass plate 23 is mounted on the front wall underneath the window opening 21 and a transparent colorless or colored glass plate 24 is set into the front wall 22 so that the outside surface of the glass plate is located flush with the outside surface of the front wall 22. If more dispersion surfaces or fewer sheets of glass are desired, the underside of glass plate 24 may be ground.

A pair of undercut guide bars 25 are fastened to the outer face of the front wall 22 parallel to the transparent glass plate 24 so that the overhanging lips 27, formed by the undercut, will extend over said glass plate. The inner walls of the grooves 26 formed by the lips 27, on the bars 25 are spaced a distance equal to the standard width of the film to be edited on the device, so that the lips 27 extend over a film located in said grooves, thereby guiding such film over the glass plate 24.

Brackets 28 and 29 are secured to the ends of the body 11 by means of screws 30. A spool 31 is rotatably mounted on the bracket 28 and film 32 passing over this spool is guided thereon by a flange 33 on the spool. The roll of film is wound onto a half spool 34 mounted on a spindle 35. This spindle is journaled in the bracket 28 and a crank 36 for controlling the rotation of said spindle is removably mounted on the spindle by a thumb screw 37. The film 32 is guided through the grooves 26 over the glass plate 24 so that diffused light from the lamp bulb 12 may shine through the portion of the film located over said glass plate.

A spindle 41 is journaled in the bracket 29 and extends through a lug 42 on said bracket to be steadied thereby. A film sprocket 38, provided with the usual sprocket teeth 39, is mounted on the spindle 41 which may be rotated by means of a crank handle 43 removably fastened to the spindle 41 by a thumb screw 44. The sprocket teeth 39 engage the usual sprocket holes 40 in the film for advancing it. A half spool 46, similar to the half spool 34 is mounted on a spindle 45 journaled in the bracket 29. The spindles 35, 45 and 41 are all of the same diameter so that one crank 36 or 43 may be exchangeably mounted on any one of these spindles. Half spool 46 is adapted to receive a roll of film coming through the guide grooves 26 from the other half spool 34.

When short films are being edited, the handle is mounted on spindle 41 and the sprocket 38 is used to position the film in the editing device. When editing long strips of film or full rolls of film, the crank handle is mounted on spindle 45 to rotate the half spool 46 to wind the film onto the spool.

The brackets 28 and 29 are provided with forwardly extending lugs 47 and 48 respectively. These lugs carry a rod 49 extending lengthwise of the editing device. A sleeve 50 is mounted on the rod 49 so that it can slide lengthwise of the rod and can be pivoted around it. A frame 51, adapted to receive and adjustably hold a magnifying glass 52 or the like is connected with the sleeve 50 so that the magnifying glass can be positioned anywhere over the film portion located over the glass plate 24 for editing the film. If a higher power, smaller field eyepiece, is desired it may be adjustably mounted for movement to and from the operator, i. e. across the strip. The magnifying glass may be swung out of the way, as illustrated in Fig. 3, and in order to prevent any damage, that may be caused by the magnifying glass forcibly contacting the base 10, the frame 51 is provided with a boss 55. When opaque strip is being edited an exterior desk lamp or room light may be used.

It is, however, to be understood that the invention is not to be restricted or limited to the exact construction and formation shown in the drawings and described in the specification and that modifications and changes in the proportions and arrangements of the parts may be made by those skilled in the art without departing from the nature and scope of the invention, but that said invention is to be limited only by the spirit and the scope of the claim appended hereto.

The invention described herein may be manufactured and used by or for the Government of the United States of America for governmental purposes without the payment of any royalties thereon or therefor.

Having described my invention and its method of operation, what I claim as new and desire to secure by Letters Patent is:

In a film editing device, a housing having a curved back constituting a reflector and a ground glass top, a source of light in said housing, a glass window mounted on the outside of said housing above said glass top and spaced therefrom, said window being substantially coextensive with the housing, several times as long as it is wide, and of the same width as the film, grooved film guide bars overhanging the edges of said window, film feeding mechanism mounted on the sides of the housing in alignment with said window to move the film longitudinally over the window in contact therewith, and an eyepiece slidably mounted on said housing in cooperative relation with the entire length of said window.

RUPERT H. DRAEGER.